United States Patent [19]
Redman et al.

[11] Patent Number: 4,479,122
[45] Date of Patent: Oct. 23, 1984

[54] REMOTELY CONTROLLED SWITCHED ACCESS TO THE CONSOLE PORT OF AN ELECTRONIC COMPUTER

[75] Inventors: Brian E. Redman, Hopatcong; Gordon D. Woods, Denville, both of

[73] Assignee: AT&T Bell Laboratories, Murray Hill, N.J.

[21] Appl. No.: 355,262

[22] Filed: Mar. 5, 1982

[51] Int. Cl.³ .............................................. H04Q 9/00
[52] U.S. Cl. ..................... 340/825.06; 179/175.3 R; 340/825.31; 340/825.5; 371/22
[58] Field of Search ..................... 340/825.06, 825.05, 340/825.04, 825.31, 825.5; 375/8, 121; 179/2 A, 175.3 R; 371/22, 8

[56] References Cited

U.S. PATENT DOCUMENTS

| Re. 30,037 | 6/1979 | Bass ....................................... 371/22 |
| 4,040,014 | 8/1977 | Gehrking ......................... 340/825.5 |
| 4,055,808 | 10/1977 | Holsinger et al. ...................... 375/8 |
| 4,310,720 | 1/1982 | Check, Jr. ...................... 340/825.31 |
| 4,351,059 | 9/1982 | Gregoire et al. ..................... 371/22 |
| 4,385,384 | 5/1983 | Rosbury et al. ........................ 371/8 |

*Primary Examiner*—Donald J. Yusko
*Attorney, Agent, or Firm*—Robert O. Nimtz

[57] ABSTRACT

In order to insure continuous access to diagnostic and maintenance information from a computer, the console port of the computer is connected either to the console locally or to a terminal remotely. In response to an activating command from the remote terminal, a switch is operated to disconnect the local console from the computer and another switch is operated to connect the remote terminal to the computer.

10 Claims, 3 Drawing Figures

REMOTELY CONTROLLED SWITCHED ACCESS TO THE CONSOLE PORT OF AN ELECTRONIC COMPUTER

TECHNICAL FIELD

This invention relates to computer systems and, in particular, to switching the connection of a computer from a local console to a modem which is activated from a remote terminal.

BACKGROUND OF THE INVENTION

In computer systems, information relating to the functioning of a computer is printed on a teletypewriter or printer associated with a console which is connected to the console port of the computer. The printed information is then used by a computer operator for maintenance or diagnostic purposes.

During periods of reduced computer use, it is not necessary for an operator to be present at the computer room. The operator may manually operate a switch to disconnect the console from the computer and to connect a modem to the console port of the computer.

On reaching a remote location, the operator establishes a connection between a terminal at the remote location and the modem in the computer room through the telephone network. A problem with this method is the loss of maintenance and diagnostic information from the computer during the interval from the time the console is disconnected until the time the operator gains access to the modem. Another problem is that the operator must anticipate the need to access the console remotely before leaving the computer site.

SUMMARY OF THE INVENTION

In accordance with the illustrative embodiment of the present invention, in response to an activating signal from a remote terminal, a modem associated therewith is connected directly with a computer; simultaneously, the local console and teletypewriter are disconnected from the computer. Thus, there is no loss of diagnostic or maintenance information from the computer.

More particularly, when the remote terminal is connected, usually through the telephone network, to the modem which is located in the computer room, power is supplied from the modem to a pair of light emitting diodes of a pair of opto-isolator switches, thereby establishing a direct connection between the computer and the modem for bidirectional information flow therebetween.

The current through the aforesaid light emitting diodes provides the base current to turn on a transistor. Current from the computer then flows through the collector-emitter path of the transistor to ground, thereby diverting current from a plurality of other light emitting diodes. The diverted current flow causes the opto-isolator switches associated with the other light emitting diodes to be turned-off, thereby disconnecting the computer from the local console and teletypewriter associated therewith.

An advantage of the present invention is the prevention of loss of information when the modem is accidentally unplugged. Because the power for the other light emitting diodes is supplied from the computer, when the modem is accidentally unplugged, the opto-isolator switches connecting the computer with the local console will be turned on.

Another advantage of the present invention is the use of low power opto-isolator switches, permitting power to be supplied therefor directly from the computer or the modem.

Another advantage of the present invention is the ability to locate a computer operator at a central location and the periodic control of a plurality of computers in different locations. Thus, a computer operator could remotely gain access to a computer by selecting a port from a multi-port data switch.

Another advantage of the present invention is its simplicity and its availability for use with any computer using the RS-232-C Standards for serial binary data interchange circuits published August 1969 by the Electronics Industries Association. The invention is also compatible with the International Telegraph and Telephone Consultative Committee (CCITT) Recommendation V. 24, Geneva, amended 1968, 1972 and 1976, Orange Book Volume VIII.1, Sixth Plenary Assembly Sept. 27 to Oct. 8, 1976.

DETAILED DESCRIPTION

Figure 1:
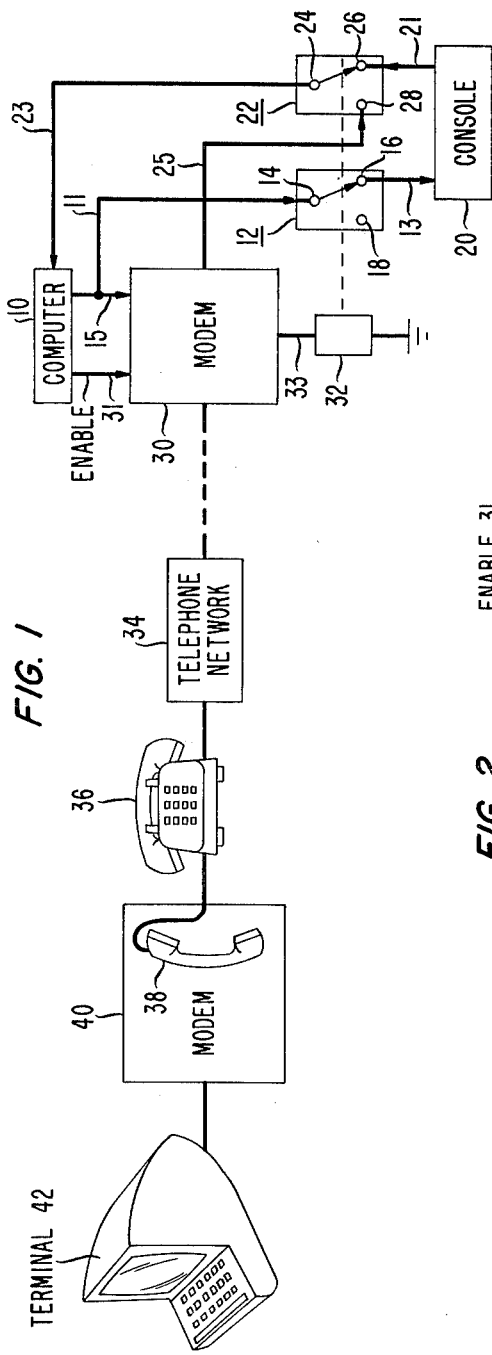
FIG. 1 shows the connections between the computer, the console and the modem in block diagram.

Referring to FIG. 1, there is shown a computer 10 connected with a console 20 through switches 12 and 22. Diagnostic and maintenance information from computer 10 is transmitted through lead 11, switch 12 and lead 13 to console 20. The information is usually printed on a teletypewriter (not shown) associated with the console 20. Commands from the console 20 are transmitted over lead 21, through switch 22, and over lead 23 to the computer 10. Typically, the computer 10 and console 20 are located in a computer room.

During periods of reduced demand, the computer operator may monitor the computer 10 from a remote location. Alternatively, the computer operator may be located at a central location and simultaneously monitor a plurality of computers at different locations. Thus, at the remote location, terminal 42 is connected to modem 40. A connection is established through telephone set 36 and the telephone network 34 to the modem 30 at the computer room. After the connection is established, the handset 38 is placed in an acoustic coupler, integral with the modem 40. Alternatively, modem 40 may be connected directly with modem 30 through a private line (not shown).

Lead 31 connects computer 10 with modem 30. When modem 30 is accessed through the telephone network 34, lead 31 conveys the authority from computer 10 to answer the incoming call. Modem 30 may be powered either from telephone network 34 or from commercial power.

In response to the connection being established between terminal 42 and modem 30, relay 32 is energized, thereby operating switches 12 and 22. When switch 12 is operated, terminals 14 and 18 are connected. Terminal 18, however, is open. Lead 11, however, is permanently connected with lead 15 establishing a permanent connection between computer 10 and modem 30, for information flow from computer 10 to modem 30.

Alternatively, modem 30 may be connected through lead 15 directly with terminal 18. That is, lead 15 is not connected to lead 11. By this means, computer 10 will not be required to supply power simultaneously to both modem 30 and console 20.

When switch 22 is operated, computer 10 is connected through lead 23, terminals 24, 28 and lead 25 to the modem 30, for information flow from modem 30 to computer 10.

Figure 2:
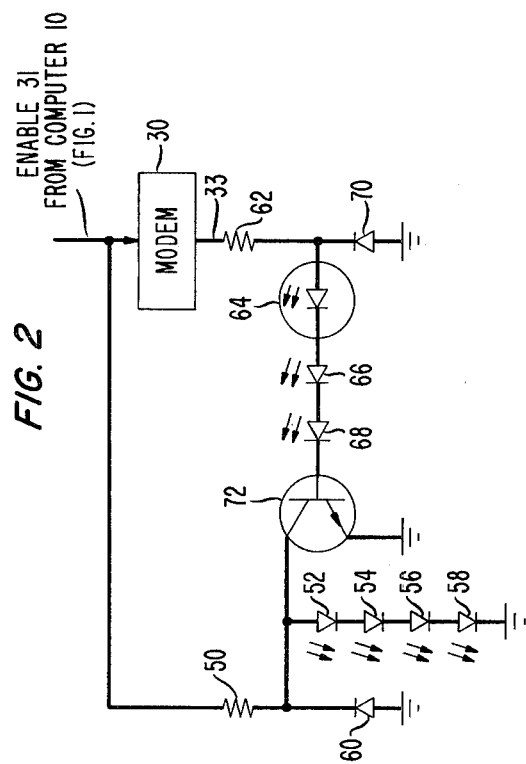
FIG. 2 shows the power supply circuit for the light emitting diodes.
Figure 3:
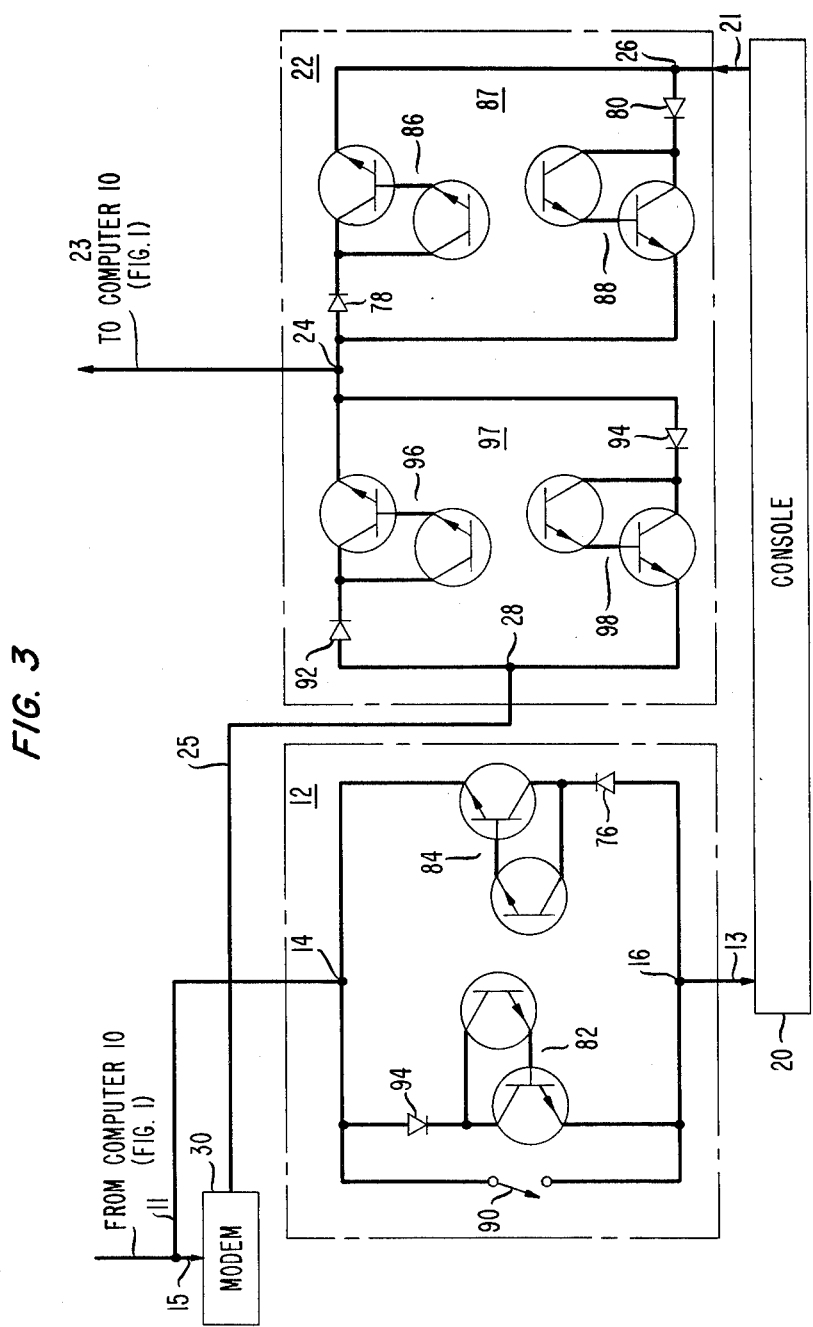
FIG. 3 shows the opto-isolator switches for the connection among the computer, the console, and the modem.

Referring more particularly to FIGS. 2 and 3, power from computer 10 is provided through current limiting resistor 50 to light emitting diodes (LEDs) 52, 54, 56 and 58. In response to light emitted from LEDs 52, 54, 56 and 58, the phototransistors 82, 84, 86 and 88 are turned on. Phototransistors 82, 84 and LEDs 52, 54 together form a pair of opto-isolators 12. The pair of phototransistors 82, 84 are connected back-to-back through blocking diodes 74 and 76, respectively.

Similarly, phototransistors 86, 88 and LEDs 56, 58 together form another pair of opto-isolators. The pair of phototransistors 86, 88 are connected back-to-back through blocking diodes 78 and 80, respectively.

Each of the aforesaid pairs of opto-isolators switches operates as a single-throw, single-pole bipolar switch that is closed when the pair of LEDs 52 and 54 or 56 and 58 is turned on and open when the LEDs are off. When a digital "0" (stated in the aforesaid RS-232-C standard as a SPACE) is transmitted from computer 10, a +12 volt signal is applied to lead 11, causing current to flow through the phototransistor 82. Likewise, when a digital "1" (stated in the aforesaid RS-232-C standard as a MARK) is transmitted from computer 10, a −12 volt signal is applied to lead 11, causing current to flow through phototransistor 84. Thus, bipolar switch 12 facilitates transmission from computer 10 to console 20. Likewise, bipolar switch 87 facilitates transmission from console 20 to computer 10.

Referring to FIG. 2, there is shown a diode 60 connected between one end of resistor 50 and ground potential. Diode 60 insures that the negative voltage is limited to −1 volt. Resistor 50, a current limiter as stated hereinabove, restricts the current flow for ±12 volt signals.

When a computer operator needs to gain access to the console port of the computer 10, modem 30 is activated by connecting the remote terminal 42 to the modem 30. Power from the modem 30 is supplied through current limiting resistor 62. Diode 70, connected between one end of resistor 62 and ground potential, limits the negative voltage to −1 volt.

Current from modem 30 through resistor 62 passes through a series of LEDs 64, 66 and 68. LED 64 indicates to a person monitoring the computer that the computer is being operated remotely. LEDs 66 and 68 provide the signals for turning on phototransistors 96 and 98, respectively. Phototransistors 96 and 98 are reverse connected back-to-back for bipolar transmission of signals from modem 30 to computer 10. Thus, when the LEDs 66 and 68 are energized, the bipolar switch 97 comprising the phototransistors 96 and 98 is turned on.

The series LEDs 66 and 68 are connected to the base electrode of transistor 72. When current flows through LEDs 66, 68 to the base of transistor 72, current is bypassed from the computer 10 through the collector-emitter path of transistor 72 to ground. This current bypass reduces the current flow through the series connected LEDs 52, 54, 56 and 58 thereby switching off the bipolar, opto-isolator switches 12 and 87. By this means, there is continuous access to the console port of computer 10 for obtaining maintenance and diagnostic information either locally or remotely.

In order to insure continuity of operations, the series LEDs 52, 54, 56 and 58 are powered directly from the computer 10. Thus, if modem 30 is accidentally unplugged, base current to transistor 72 will be removed; current flow from computer 10 will begin to flow once more through LEDs 52, 54, 56 and 58 to turn on bipolar switches 12 and 87. That is, if bipolar switch 97 is shut off, bipolar switches 12 and 87 will automatically be switched on.

Because the power required to operate opto-isolator switches 12, 87 and 97 is small, these switches are powered directly from either computer 10 or modem 30. Such a scheme permits flexibility in location of the switches.

The switches meet the requirements of the RS-232-C Standards for serial binary data interchange circuits published August 1969 by the Electronics Industries Association. The switches are also compatible with the International Telegraph and Telephone Consultative Committee (CCITT) Recommendation V. 26, Geneva, amended 1968, 1972 and 1976, Orange Book Volume VIII.1, Sixth Plenary Assembly Sept. 27 to Oct. 8, 1976.

Referring briefly to FIG. 3 again, in another embodiment of the present invention, a manually operated switch 90 is provided, in parallel, across the opto-isolator switch 12. Where it is necessary to have diagnostic information transmitted from the computer 10 to both console 20 locally and to terminal 42 remotely, switch 90 is closed.

What is claimed is:

1. Apparatus for reversibly disconnecting a console from a computer and simultaneously therewith connecting a modem with said computer, said apparatus comprising
   first switching means for connecting said console and said computer, and
   second switching means for connecting said computer and said modem.

2. The apparatus according to claim 1 wherein said first switching means comprises first and second bipolar switches, said first bipolar switch facilitating information flow from said computer to said console, and said second bipolar switch facilitating information flow from said console to said computer.

3. The apparatus according to claim 2 wherein each of said first and second bipolar switches comprises a first network comprising a first diode connected in series with a first phototransistor, and a second network comprising a second diode connected in series with a second phototransistor, said first and second networks connected in parallel so that said phototransistors are oppositely connected.

4. The apparatus according to claim 3 wherein each of said first and second phototransistors comprises a Darlington pair of phototransistors.

5. The apparatus according to claim 4 wherein said phototransistors are turned on by light emitted from a first plurality of light emitting diodes, said first light emitting diodes being connected between said computer and a common ground potential.

6. The apparatus according to claim 1 wherein said second switching means comprises a bipolar switch facilitating information flow from said modem to said computer.

7. The apparatus according to claim 6 wherein said bipolar switch comprises a pair of reverse biased phototransistors, each of said phototransistors being connected in series with a diode, and each of said phototransistors comprising a pair of Darlington phototransistors.

8. The apparatus according to claim 7 wherein said phototransistors are turned on by light emitted from a second plurality of light emitting diodes, said second plurality of diodes being connected between said modem and the base electrode of a transistor.

9. The apparatus according to claims 5 or 8 wherein said computer is connected to the collector electrode of said transistor and the emitter electrode of said transistor is connected to said ground potential, so that when said transistor is turned on current flows from the computer through the collector-emitter path of said transistor, thereby operating said first switching means to disconnect said console from said computer and operating said second switching means to connect said modem to said computer.

10. A remote console arrangement for a digital computer comprising
    a local console,
    a modem for communication with a remote console, and
    switching means, responsive to the activation of said modem by said remote console for transferring said computer from said local console to said remote control.

* * * * *